(12) United States Patent
Czerniak et al.

(10) Patent No.: US 9,631,810 B2
(45) Date of Patent: Apr. 25, 2017

(54) METHOD OF TREATING AN EXHAUST GAS STREAM

(75) Inventors: Michael Roger Czerniak, Wellington (GB); Gareth David Stanton, Clevedon (GB)

(73) Assignee: Edwards Limited, Crawley (GB)

( * ) Notice: Subject to any disclaimer, the term of this patent is extended or adjusted under 35 U.S.C. 154(b) by 146 days.

(21) Appl. No.: 13/143,708

(22) PCT Filed: Jan. 21, 2010

(86) PCT No.: PCT/GB2010/050087
§ 371 (c)(1),
(2), (4) Date: Jul. 7, 2011

(87) PCT Pub. No.: WO2010/092365
PCT Pub. Date: Aug. 19, 2010

(65) Prior Publication Data
US 2012/0090338 A1    Apr. 19, 2012

(30) Foreign Application Priority Data

Feb. 11, 2009  (GB) .................................. 0902234.4

(51) Int. Cl.
*F25D 17/06*    (2006.01)
*F23G 7/06*    (2006.01)
(Continued)

(52) U.S. Cl.
CPC .............. *F23G 7/065* (2013.01); *B01D 53/79* (2013.01); *F23J 15/06* (2013.01);
(Continued)

(58) Field of Classification Search
CPC .............. B01D 53/79; F23G 2204/103; F23G 2207/50; F23G 2209/142; F23G 7/065; F23J 15/06; F23J 2219/80; Y02E 20/363
(Continued)

(56) References Cited

U.S. PATENT DOCUMENTS 4,284,609 A * 8/1981 deVries ................. B01D 47/05
                                                423/210
4,322,224 A * 3/1982 Roth ................................. 95/11
(Continued)

FOREIGN PATENT DOCUMENTS

CN        1791768 A      6/2006
JP     2000254447 A      9/2000
(Continued)

OTHER PUBLICATIONS

Translation of the First Office Action and Search Report mailed May 29, 2013 in corresponding CN Application No. 201080007436.3, 11 pgs.
(Continued)

*Primary Examiner* — Jessee Roe
*Assistant Examiner* — Jenny Wu
(74) *Attorney, Agent, or Firm* — Shumaker & Sieffert, P.A.

(57) ABSTRACT

The present invention provides a method of treating an exhaust gas stream 12 from a processing chamber 10. The method comprises the steps of: conveying the exhaust gas from the processing chamber using a vacuum pumping arrangement 11, 22 or atmospheric line; abating the exhaust gas in an abatement region 18 of an abatement device 14; and injecting a cooling agent, such as a liquid 26, downstream of the abatement region to cool the abated gases in a cooling region 24 by phase change of the cooling agent.

9 Claims, 1 Drawing Sheet

(51) Int. Cl.
  *B01D 53/79* (2006.01)
  *F23J 15/06* (2006.01)
(52) U.S. Cl.
  CPC .... *F23G 2204/103* (2013.01); *F23G 2207/50* (2013.01); *F23G 2209/142* (2013.01); *F23J 2219/80* (2013.01); *Y02E 20/363* (2013.01)
(58) Field of Classification Search
  USPC ........................................ 423/210; 62/91, 89
  See application file for complete search history.

(56) References Cited

U.S. PATENT DOCUMENTS

| | | | | |
|---|---|---|---|---|
| 4,345,916 | A | * | 8/1982 | Richards et al. ................. 95/60 |
| 4,748,010 | A | * | 5/1988 | Walker ........................... 423/176 |
| 5,891,404 | A | * | 4/1999 | Ibaraki et al. ................. 422/182 |
| 6,468,490 | B1 | * | 10/2002 | Shamouilian et al. ....... 423/241 |
| 2004/0141900 | A1 | | 7/2004 | Lei |
| 2004/0207102 | A1 | * | 10/2004 | Sugimori et al. .......... 261/112.1 |
| 2008/0017108 | A1 | | 1/2008 | Czerniak et al. |
| 2009/0064909 | A1 | * | 3/2009 | Mennie et al. ................ 110/212 |
| 2011/0036014 | A1 | * | 2/2011 | Tsangaris .................. C01B 3/22 48/62 R |

FOREIGN PATENT DOCUMENTS

| | | |
|---|---|---|
| JP | 2001004288 | 1/2001 |
| JP | 2001004288 A * | 1/2001 |
| JP | 2001-349521 | 12/2001 |
| JP | 2004-361059 | 12/2004 |
| JP | 2005-098680 | 4/2005 |
| WO | 03016785 A1 | 2/2003 |
| WO | WO 2006117531 A1 * | 11/2006 |

OTHER PUBLICATIONS

EPO Communication under Rule 161 EPC dated Sep. 6, 2011 in corresponding EP application No. 10704402.6, 5 pgs.
Response filed Mar. 14, 2012 to the EPO Communication under Rule 161 EPC dated Sep. 6, 2011 in corresponding EP application No. 10704402.6, 7 pgs.
Translation of KR Office Action mailed Jan. 4, 2013 in corresponding KR application No. 10-2011-7018267, 6 pgs.
Office Action from counterpart European Application No. 10704402.6, dated Jun. 24, 2014, 4 pp.
English Translation of Second Office Action from Chinese counterpart application No. 201080007436.3, dated Apr. 1, 2014, 12 pp.
Translation of Notification of Reason for Rejection mailed Nov. 27, 2013 in corresponding JP Application No. 2011-549661, 4 pgs.
English Translation of the Office Action from counterpart Taiwan Patent Application No. 098146522, dated Sep. 12, 2014, 4 pp.
Examination Report from counterpart European Application No. 10704402.6, dated Apr. 21, 2015, 4 pp.

* cited by examiner

METHOD OF TREATING AN EXHAUST GAS STREAM

CROSS-REFERENCE TO RELATED APPLICATIONS

This application is a national stage entry under 35 U.S.C. §371 of International Application No. PCT/GB2010/050087, filed Jan. 21, 2010, which claims the benefit of Great Britain Application 0902234.4, filed Feb. 11, 2009. The entire contents of International Application No. PCT/GB2010/050087 and G.B. Application 0902234.4 are incorporated herein by reference.

TECHNICAL FIELD

The present invention relates to a method of treating an exhaust gas stream.

There are many known manufacturing processes using processing gases which result in noxious substances being exhausted from a processing chamber which subsequently require treatment. The manufacture of components for semiconductor wafers, flat panel displays and solar cells are examples of products which require processing using processing gases in a processing chamber. Such processes produce exhaust gases which contain gases such as silane ($SiH_4$), Arsine ($AsH_3$) and hydrogen ($H_2$), which may be flammable or toxic and require treatment prior to release into the atmosphere or other disposal.

BACKGROUND

Summary

The present invention provides a method of treating an exhaust gas stream from a processing chamber, the method comprising the steps of:

conveying the exhaust gas from the processing chamber using a vacuum pumping arrangement or atmospheric line;

abating the exhaust gas in an abatement region of an abatement device; and injecting a cooling agent downstream of the abatement region to cool the abated gases in a cooling region by phase change of the cooling agent.

Other preferred and/or optional aspects of the invention are defined in the accompanying claims.

BRIEF DESCRIPTION OF THE DRAWINGS

In order that the present invention may be well understood, embodiments thereof, which are given by way of example only, will now be described with reference to the accompanying drawings, in which.

DETAILED DESCRIPTION

Figure 2:
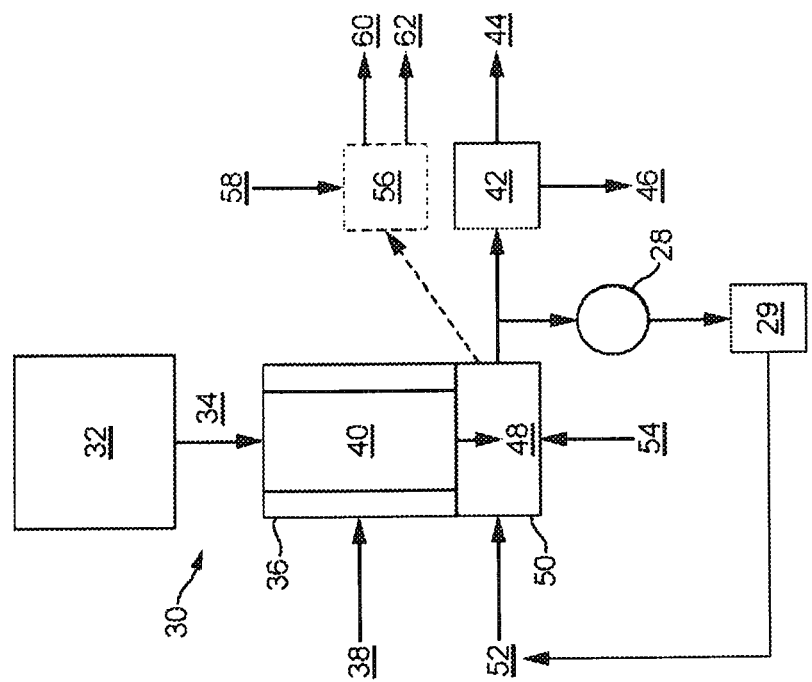
FIG. 2 shows schematically another system for treating exhaust gases from a processing chamber.

The exhaust gases may be treated in any of a number of different ways. Typically, exhaust gases are reacted in a burner (or other treatment device which imparts energy to the gas stream including; plasmas, electrically heated catalytic columns, electric furnaces, etc) to thermally decompose, or otherwise treat, noxious substances in the exhaust stream prior to disposal. An example of a burner/combustor is used specifically herein, however the abatement device could be a range of techniques which introduce energy to a gas stream. The exhaust gases become hot and therefore require to be cooled prior to emission to the environment. Methods available for cooling involve either direct contact with the cooling fluid (mixing with water, air, etc) or indirect contact with a cooling fluid (heat exchanger, radiator, etc). A method commonly employed (as described in EP0694735) has a water column or weir arrangement which may be adopted downstream of the combustor for cooling the gases. In this arrangement, the gases are cooled by close proximity to or contact with running water, and particulates or powder in the combustion gases are entrained in the water. Cooling the combustion gases in this way requires a considerable quantity of water which adds significantly to the cost of treatment. Further, the arrangement requires the management and disposal of wet powder and the presence of particulates in the water system may reduce reliability; additionally particulates may be toxic, as in the case of arsenic oxide. In the case of toxic solids exhaust gas stream filtration delivers a lower volume of contaminated material than conventional wet scrubbing.

In another cooling arrangement combustion gases are cooled by an air-stream which is introduced to cool the combustion gases. If the combustion gases contain particulates, the air-stream and the combustion gases are passed through a filtration system to remove the particulates and allow the air to be re-circulated or released to atmosphere. The filtration systems which are used in the filtration of finely divided silica, can typically operate to remove particulates from gas streams only if the gas streams are relatively cool and constituents in the gas stream do not condense in the system. Therefore increased quantities of air must be used to cool the combustion gases to allow filtration to take place. If the exhaust gases from a processing chamber generate a high heat load in the burner (for instance where the exhaust gases contain hydrogen or silane), still further quantities of air must be used to cool the combustion gases sufficiently for filtration to occur.

In some arrangements, a vacuum pumping arrangement is placed downstream of the treatment device. The vacuum pumping arrangement must have sufficient capacity to draw not only the combustion gases but also the air introduced to cool the gases. Generally, the cost of a vacuum pumping arrangement increases as the pumping capacity increases. The problem is further exacerbated if further quantities of air are required to cool exhaust gases containing such constituents as hydrogen or silane. Semi-conductor wafer or other processing techniques occur within a processing chamber, this operation usually taking place at low pressure in the region of 1 mTorr to 1 Torr (however processes such as SACVD may occur close to atmospheric pressure). Such low pressures are achieved with a vacuum pumping arrangement. If the exhaust gases are flammable, then it is desirable to treat the flammable constituents prior to the vacuum pumping arrangement (or between vacuum pumping stages). The flammability of gases depends on a self sustaining chain of single reactions; for energy to transfer successfully from one set of molecules (combustion products) to another set of molecules (reactants) the two molecule sets require to be close for energy absorption. Dilution acts both to surround and separate the reactive molecules; this causes energy to be absorbed by inert molecules (the walls of the vessel containing the reaction can be considered as inert molecules). Eventually a self-sustaining reaction is no longer possible and this is defined as the Lower Flammability Limit.

Reducing the pressure of a system increases separation of molecules within a reaction vessel. The inert and reactive molecules of the process remain in constant proportion; however the walls of the vessel retain a constant surface area. This constant surface area at reduced pressure results in a higher proportion of the energy being absorbed by the walls of a vessel before the energy can activate reactive molecule's. Consequently the concentration of reactive molecules necessary for sustaining a chain reaction at low pressure is higher than the concentration required at atmospheric pressure. Hence, gas streams which are non-flammable at low pressure become flammable if the pressure is increased to atmospheric pressure. Therefore flammable gases can be reacted at low pressure in a controlled way, before they become potentially hazardous/flammable at atmospheric pressure.

An additional hazard is that vacuum pumping arrangements (in common with many mechanical items) comprise moving metal parts which can contact each other to generate a spark thereby igniting the gas stream. This problem is exacerbated in later stages of a vacuum pumping arrangement where the gases arc close to atmospheric pressure. The problem can be mitigated by introducing large quantities of a purge gas, such as nitrogen, upstream of the vacuum pumping arrangement. However, as discussed herein significant dilution leads to the requirement for larger pumping mechanisms, higher inert gas costs and higher power consumption. An alternative solution involves burning the exhaust gases in a burner and then conveying the combustion gases through the vacuum pumping arrangement. Although this latter solution removes flammable substances from the exhaust gases, the combustion gases are hot and heat the vacuum pumping arrangement. The vacuum pumping arrangement must therefore be cooled or the gas flow into the pump must be cooled so as to avoid damaging the pump. However, vacuum pumps are designed to provide a vacuum at a given process flow therefore significantly increasing the process flow degrades vacuum performance and increases the power consumption. Therefore, a partial solution which simply involves adding large flows of cooling gas is not advisable.

Embodiments of the present invention provide a method for cooling gases after treatment, or abatement, which involves the injection of a cooling agent into a cooling region downstream of an abatement region. The cooling agent may be a liquid such as water, injected optionally as a finely divided mist or spray into the heated plume emanating from a treatment device. The liquid absorbs heat by evaporative cooling when the liquid changes phase from liquid to gas. Since the principle method by which heat is absorbed is by phase change, the present invention also includes injection of substances in other states such that they may change phase to absorb heat in the system. For example, carbon dioxide may be injected as a solid and undergoes sublimation changing phase to a gas. Alternatively, ice particles could be injected changing phase to liquid water and then also possibly changing phase to a gas. However, the description of the embodiments herein is directed specifically to the injection of liquid as a cooling agent into the gas stream.

Absorbing energy by phase change is advantageous because it does not significantly add to the volume of the gas stream handled by a downstream apparatus such as a filtration apparatus or vacuum pumping arrangement. Accordingly, the capacity of the downstream apparatus need not generally be increased to manage increased gas flow volume.

The methods allow cooling of exhaust gases at sub-atmospheric, atmospheric (dry filtration), atmospheric (wet scrubbing) pressures for example to below a lower flammability limit.

In the case of the sub-atmospheric applications which may be at a pressure between about 50 and 750 mbar, the gases passing into a vacuum pumping arrangement can range in temperature from 25-250° C. In this method, the heat energy present in the gases emanating from the treatment device is determined and the injection of liquid is controlled so that once evaporated does not subsequently condense due to the pressure generated by the vacuum pumping arrangement and so that the combustion gases are not hot enough to damage the pumping mechanism.

In the case of the atmospheric applications in combination with dry filtration, the injection of liquid is controlled so that the cooled gas mixture is non-condensing and of a reasonably low temperature (e.g. <70° C. depending on the filtration unit) so as not to damage the membrane of the filter.

In the case of atmospheric applications with wet scrubbers, the injection of liquid aids the wet scrubbing mechanism by both reducing the gas flow into the wet scrubber and preconditioning the waste products in the gas stream to improve wet scrubbing. The wet scrubber can form part of the treatment system or can be remote therefrom. In the latter case a single wet scrubber receives gas from one or more abatement units.

The preconditioning of the waste gas involves evaporating a liquid such as water into the gas plume. The wet scrubber rapidly cools the gas mixture resulting in the gas plume becoming saturated. The evaporated liquid has a propensity to condense around solid particles within the system which act as nucleation sites thereby forming droplets of liquid with a solid core. The condensation/nucleation process improves removal of particulates by the wet scrubber, as the particulates are contained in a liquid droplet which makes it significantly larger and more readily mixed with the wet scrubbing medium. The temperature of the gases passing into the scrubber depends on the temperature tolerance of the wet scrubber unit, for example a system in which the vessel wall is formed by a water weir can be operable with a gas stream in excess of 100° C., whereas a wet scrubber made of polypropylene require a temperature of less than about 100° C.

Figure 1:
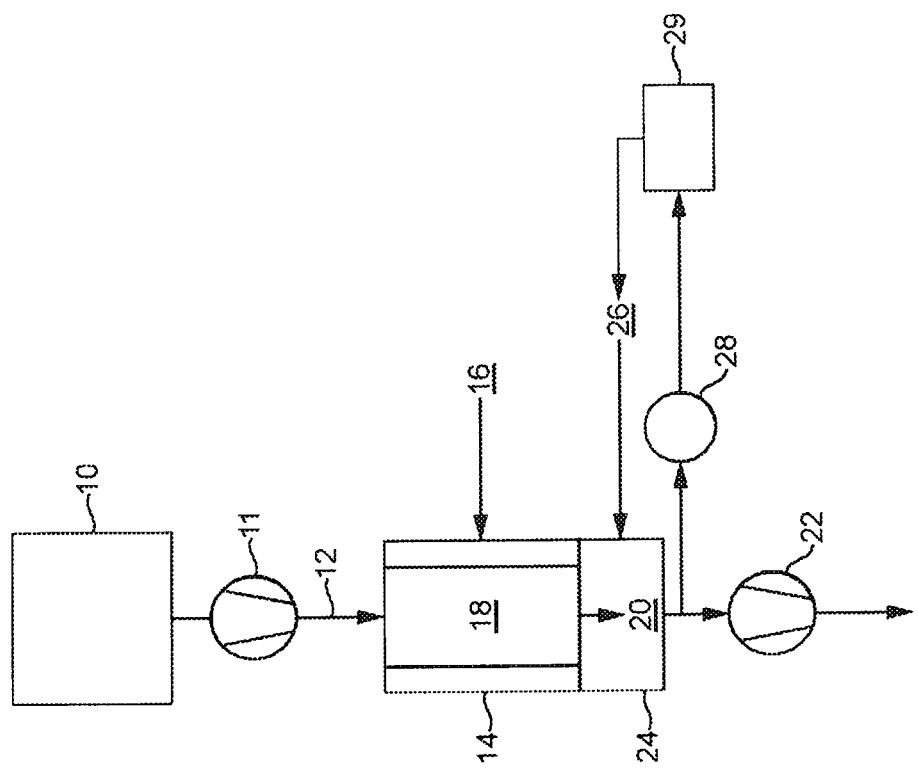
FIG. 1 shows schematically a system for treating exhaust gases from a processing chamber.

Referring to FIG. 1, a processing chamber 10 is shown from which processing gas is exhausted during or after processing. The system normally comprises a primary vacuum pumping arrangement 11 for exhausting gas and conveying it through the system. The vacuum pumping arrangement 11 also isolates combustion or other abated gases from the processing chamber 10. Although not shown, in some systems the processing chamber may be connected directly to an abatement unit.

In place of a vacuum pumping arrangement the process gases may be conveyed by connecting the process chamber to atmosphere with an atmospheric line and suitable valve arrangement.

The exhaust gases 12 are conveyed to an abatement unit, such as a burner 14. The burner 14 may be a radiant burner as shown (or other abatement devices which impart energy to the gas stream including; plasmas, electrically heated catalytic columns, electric furnaces). A system for treating exhaust gas is shown in GB0724717.4, the contents of which are hereby incorporated by reference. A fuel gas 16 is introduced to the burner and ignited for combusting the exhaust gases in an abatement, or combustion, region 18 of the burner.

When the exhaust gases are combusted, hot combustion gases (abatement gases) 20 are produced which may be at a temperature in the region of 500-2000° C. Prior to introduction to a vacuum pumping arrangement 22, the combustion gases which are at low, or sub-atmospheric, pressure, are passed through a cooling region 24. A cooling agent which may be a liquid such as water 26 is introduced by injection into the cooling region 24 for cooling the combustion gases by phase change of the cooling agent. The water may be introduced as a fine spray thereby providing a relatively large surface area to volume ratio so that the liquid evaporates more easily. Fine sprays can be generated using spray nozzles, and arc available from a range of companies for example AutoJet Technologies, a division of Spraying Systems Co.

The vacuum pumping arrangement 22 is operable with the primary vacuum pumping arrangement 11 to evacuate processing gases from the processing chamber 10 and exhaust cooled combustion gases either for further treatment or release to atmosphere. The vacuum generated by vacuum pumping arrangements 11, 22 draws gases from the processing chamber and through the abatement device (shown as a combustor in the illustration). The vacuum pumping arrangement typically comprises metal parts which move one relative to another. If the parts become worn or accumulate deposits, it may cause the parts to come into contact generating a spark. However, the burner 14 has combusted flammable substances in the gas stream upstream of the vacuum pumping arrangement and therefore, any spark generated cannot ignite the gas stream and does not damage the vacuum pumping arrangement or other equipment. Moreover, as the combustion gases 20 are cooled in the cooling region prior to entering the vacuum pumping arrangement, the vacuum pumping is not heated excessively and does not require additional cooling.

Water, or other liquid, is introduced to the cooling region and on contact cools the hot post abatement gases 20. Cooling may occur by both the latent heat of evaporation of the liquid and also through the process of heating the injected liquid.

The heat capacity and phase change properties of suitable cooling agents are shown below.
Water:
heat capacity liquid=4.2 kJ $kg^{-1}$ $K^{-1}$
heat capacity gas=2.0 kJ $kg^{-1}$ $K^{-1}$
latent heat of evaporation=2270 kJ $kg^{-1}$
Carbon Dioxide
heat capacity gas=0.9 kJ $kg^{-1}$ $K^{-1}$
latent heat of evaporation=574 kJ $kg^{-1}$
Nitrogen
heat capacity gas=1.0 kJ $kg^{-1}$ $K^{-1}$
latent heat of evaporation=199 kJ $kg^{-1}$
Of these commonly available materials, water is currently preferred, being cheap, readily available and possessing a large cooling effect on evaporation. Carbon dioxide has useful properties, including reducing flammability and could be used as a solid (dual phase change) or liquid.

The large cooling effect generated by the phase change of the injected liquid results in only a small change in gaseous exhaust flow (i.e. 1 g of water occupies ~1.25 liters, but has the cooing effect of ~20 liters of air for a fluid entering the system at 20° C. and exiting at 120° C.). Accordingly, it is not necessary to provide the vacuum pumping arrangement with increased capacity and as described below with reference to FIG. 2 it is also not necessary to provide wet scrubbers or filtration systems with increased capacity. Reducing the flow of gas through a vacuum pump reduces the energy consumption of the pump as well as reducing the size of the vacuum pump required.

It is desirable to control the amount of water entering the cooling region 24 to achieve a number of different results. First, the acceptable working temperatures of the vacuum pumping arrangement are known. If the temperature and mass or volume flow rate of the combustion gases are also known it can be determined the amount of water which must be introduced to the cooling region 24 to achieve adequate temperature reduction of the combustion gases. Accurate control of the amount of water introduced also avoids wasting water and adding to the cost of ownership.

Additionally, it is desirable that liquid water is not allowed to enter or condense within higher pressure regions of the vacuum pumping arrangement, thereby avoiding hydraulic lock, potential corrosion of metal and other parts in the vacuum pumping arrangement. Accordingly, the amount of water introduced to the cooling region 24 is controlled such that substantially all of it is evaporated prior to entry into the vacuum pumping arrangement.

The amount of water 26 required can be predetermined for the expected flow rate of combustion gases 20 or a plurality of expected flow rates, and the introduction of water to the cooling region 24 controlled accordingly. Alternatively, one or more sensors 28 can be provided, for example at the exhaust of the cooling region as shown, for sensing the temperature or another characteristic of the combustion gases 20. The sensors are adapted to output a signal to a control unit 29 for controlling flow of water 26 into the cooling region.

For fixed process gas (e.g. hydrogen) flows, pre-determined flows of water could be injected; otherwise a feedback loop could be used that regulated the amount of water injected so as to maintain a pre-determined exhaust gas temperature (e.g. 70° C.).

The water can be introduced to the cooling region 24 by different arrangements. For example, the water may be atomised and introduced as a mist (fine mists aid evaporation). Atomisation can be controlled to regulate the size and quantity of water particles entering the cooling region 24. Alternatively, water may be introduced at pressure as one or more fine jets through a nozzle. Still further, the water may be introduced along a capillary such that pressure in the cooling region, and the diameter and length of the capillary controls the amount of water entering the cooling region.

Referring to FIG. 2, a system 30 is shown for treating exhaust gases. A processing chamber and vacuum pumping arrangement is shown as one unit 32 in FIG. 2 from which process gas 34 is exhausted. The exhaust gases are abated by an abatement unit, or as shown are combusted in a burner 36, which may be a radial burner. A fuel gas 38 is introduced to the burner and ignited for combusting the exhaust gases in a combustion, or abatement, region 40 of the burner.

In one arrangement shown in solid lines, a filtration apparatus 42, for example a powder filtration device, filters particulates, powder or other solid matter from combustion gases producing filtered gas 44 and powder 46.

In another arrangement shown in broken lines, a wet scrubber 56 is provided for scrubbing the abatement gases. A scrubbing medium 58, such as water, is introduced for entraining particulates in the abatement gases. Air 60 and wet powder 62 are exhausted from the wet scrubber 56.

Combustion gases 48 exhausted from the burner 36 are cooled in cooling region 50 by introduction of an air-stream 52. As explained in more detail below, cooling with the air-stream alone may not sufficiently cool the combustion gases or alternatively considerable amounts of air must be used to sufficiently cool the combustion gases 48. Accordingly, a cooling agent such as water or other liquid 54 is introduced by injection into the cooling region 50 for cooling the hot combustion gases by phase change of the cooling agent. Cooling occurs principally by latent heat of evaporation of the liquid, although it will be appreciated that some cooling occurs by heating the cooling agent without phase change.

A typical filtration apparatus 42 has an upper working temperature of about 70° C. A high heat load may be generated in the burner 36, such as when combusting hydrogen from a semiconductor or solar cell deposition process. In this regard, several hundred liters per minute of hydrogen can raise the combustion gas temperature to above 130° C. In the prior art, the additional heat load requires significantly increased amounts of air to be introduced to the cooling region for cooling which, in turn, requires much larger (and more expensive) powder filtration to be employed. In the FIG. 2 arrangement, the hot combustion gases are cooled sufficiently by the water 54 so that additional amounts of air are not required and so that the filtration apparatus operates below its upper working temperature.

If the temperature and mass or volume flow rate of the combustion gases 48 are also known it can be determined the amount of water 54 which must be introduced to the cooling region 50 to achieve adequate temperature reduction of the combustion gases. Accurate control of the amount of liquid (such as water) introduced also avoids wasting water and adding to the cost of ownership.

Additionally, it is desirable that liquid water is not allowed to enter the filtration apparatus since this would impair its normal function. Accordingly, the amount of water introduced to the cooling region 50 is controlled such that substantially all of it is evaporated prior to entry into the filter. It is essential that there is sufficient allowance made for cooling between the combustor and the filters, so that the water within the gas plume does not start to condense out. This requires the humidity in the cooled exhaust flow to be less than 100% relative humidity at the point of cooling.

If a wet scrubber 56 is provided, the injection of liquid 52 into the cooling region potentiates the efficiency of the wet scrubber by providing nucleation and condensation processes in the abated gases upstream of the wet scrubber. The amount of liquid injected into the cooling region is controlled as previously described herein to limit heating of the wet scrubber to within tolerances.

The water 54 may be introduced to the cooling region 50 by spraying, atomisation or other techniques as described above with reference to FIG. 1.

The invention claimed is:

1. A method of treating an exhaust gas stream from a processing chamber, the method comprising the steps of:
   conveying the exhaust gas from the processing chamber using a vacuum pumping arrangement or atmospheric line;
   abating the exhaust gas in an abatement region of an abatement device; injecting a cooling agent downstream of the abatement region to cool the abated gases in a cooling region by phase change of the cooling agent and form a cooled gas mixture including the cooled abated gases and the cooling agent;
   dry filtering particulates from the cooled gas mixture using a dry filtration apparatus downstream of the cooling region;
   sensing at least one of the flow rate and temperature of the abated gases of the abated exhaust gas with a sensor;
   adjusting an amount of the cooling agent injected downstream of the abatement region according to the at least one of the sensed flow rate and temperature of the abated gases to change a phase of substantially all of the cooling agent in the cooling region and result in the cooled gas mixture having a relative humidity of less than 100% to be non-condensing after injecting the cooling agent and through the dry filtration apparatus.

2. The method of claim 1,
   wherein conveying the exhaust gas from the processing chamber using the vacuum pumping arrangement or atmospheric line comprises conveying the exhaust gas from the processing chamber using the vacuum pumping arrangement, and
   wherein the cooling region is at a pressure which is less than atmospheric and is upstream of the vacuum pumping arrangement, such that gas load on the vacuum pumping arrangement is not generally increased by injection of the cooling agent into the gas stream.

3. The method of claim 1, wherein the cooling agent is injected as a spray or mist.

4. The method of claim 3,
   wherein conveying the exhaust gas from the processing chamber using the vacuum pumping arrangement or atmospheric line comprises conveying the exhaust gas from the processing chamber using the vacuum pumping arrangement,
   wherein the vacuum pumping arrangement is located downstream of the cooling region, and
   wherein adjusting an amount of the cooling agent injected downstream of the abatement region comprises adjusting the amount of cooling agent injected downstream of the abatement region to the cooling region such that the abated gases are cooled to a temperature below an upper working temperature of the vacuum pumping arrangement.

5. The method of claim 1, wherein the dry filtration apparatus has an upper working temperature, and wherein adjusting an amount of the cooling agent injected downstream of the abatement region further comprises adjusting the amount of cooling agent injected downstream of the abatement region to the cooling region such that the abated gases are cooled to a temperature below the upper working temperature of the dry filtration apparatus.

6. The method of claim 1, wherein the cooling agent comprises air.

7. The method of claim 1, further comprising maintaining the cooling region at a pressure of between about 50 and 750 mbar.

8. The method of claim 1, wherein the cooling agent comprises one of water, nitrogen or carbon dioxide.

9. The method of claim 1, wherein the adjusting the amount of cooling agent injected downstream of the abatement region comprises regulating the amount of cooling agent injected downstream of the abatement region via a feedback loop.

* * * * *